Nov. 17, 1964  W. H. BRACKBILL  3,157,019
REUSEABLE RESILIENT MOUNTING FOR A RAKE TINE
Filed Aug. 15, 1963

INVENTOR.
WARREN H. BRACKBILL
BY
ATTORNEY

United States Patent Office 3,157,019
Patented Nov. 17, 1964

3,157,019
REUSEABLE RESILIENT MOUNTING FOR A RAKE TINE
Warren H. Brackbill, Paradise, Pa., assignor to Sperry Rand Corporation, New Holland, Pa., a corporation of Delaware
Filed Aug. 15, 1963, Ser. No. 302,258
6 Claims. (Cl. 56—400)

This invention relates generally to hay rakes and more particularly to a mounting for a rake tine.

In recent years, rubber mounted rake tines have increased in use. Generally, they are superior to rake tines which are mounted by means of steel spring coils because the rubber mounted tines have the ability to flex in any direction and then return to their original position without damage. Sometimes the steel coil of a conventional tine becomes over stressed and bent. Then the tine has to be replaced before it has actually worn too short for service.

One main disadvantage of a rubber mounted tine is that it costs more than a spring coil tine. Further, in a rubber mounted tine structure, the rubber block which mounts the tine is the most costly element. Heretofore, it has been necessary to throw away both the tine and the rubber mount in order to replace a worn tine. This is because the tine and mount are permanently bonded together. The costly rubber mount has to be discarded because of the lower cost tine being worn out.

One object of this invention is to provide a rubber mounted rake tine whereby when the tine is worn and needs to be replaced, the rubber mounting may be reused with a new tine.

Another object of this invention is to provide a rake tine assembly wherein only a steel tine need be replaced when it is worn and the remainder of the tine structure may be retained for use with a new tine element.

A further object of this invention is to provide a rubber mounting for a rake tine wherein the tine is connected structurally to a rubber block, rather than by bonding, and locked to the block so that the tine does not rotate relative thereto.

A still further object of this invention is to provide a resilient tine mounting structure which is of relatively simple and inexpensive construction whereby it will have a low initial manufacturing cost.

Other objects of this invention will be apparent hereinafter from the specification or from the recital in the appended claims.

Figure 1:
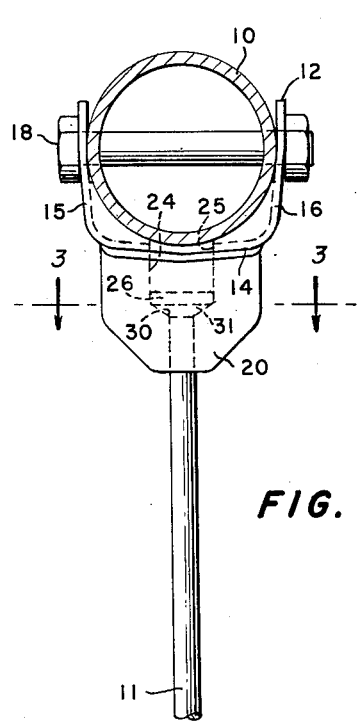
FIG. 1 is a transverse vertical section through a rake bar having connected thereto a rubber mounted rake tine constructed according to this invention, only a portion of the tine being shown.
Figure 2:
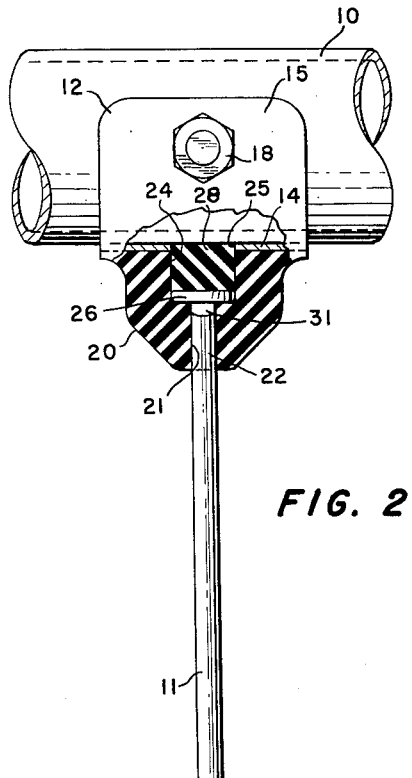
FIG. 2 is a side elevation looking from the left of FIG. 1 with a portion of the mounting broken away to show the details of the construction.
Figure 3:
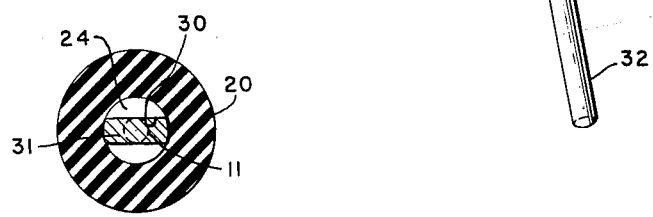
FIG. 3 is a horizontal section taken on the line 3—3 of FIG. 1 looking in the direction of the arrows.

Referring now to the drawing by numerals of reference, 10 denotes a horizontally extending, tubular, elongated rake bar on which a steel tine 11 is mounted and extending downwardly in a direction generally perpendicular to the axis of the bar. The tine is connected to the rake bar by a bracket 12 which is U-shaped when viewed as shown in FIG. 1. Bracket 12 has a bight portion 14 and a pair of side legs 15 and 16 which straddle bar 10. A bolt 18 projects transversely through legs 15 and 16 and through bar 10 to securely connect the bracket to the bar. The size of the bracket is such that bight 14 abuts against the bottom of bar 10.

Affixed to bight portion 14 of bracket 12, preferably by bonding, is a rubber block 20. Block 20 has a center opening 21 through which the upper end of body portion 22 of the tine 11 extends. This opening 21 communicates with a recess 24 in the end of block 20 adjacent bight 14 and the bight has an opening 25 which registers with recess 24 to provide communication with the lower periphery of bar 10.

As shown, recess 24 is enlarged relative to opening 21 and tine 11 has an enlarged head 26 which fits in the inner end of recess 24. Therefore, axial movement of tine 11 in a direction away from the rubber block 20 is prevented. Preferably, the portion 22 of tine 11 is press fitted in opening 21 and head 26 is similarly fitted in recess 24. The size of head 26 is such relative to the depth of recess 24 that a space is provided between head 26 and bar 10. Located in such space and interposed between head 26 and the bottom periphery of the bar 10 is a rubber insert 28. The transverse dimension of the insert 28 is such relative to the recess 24 that there is an interference fit between the parts to hold the insert in place. Further, in a radial direction, the insert is of somewhat greater depth than the distance between the top of head 26 of the tine and the bar 10 whereby the insert is compressed when the bracket 12 is connected to the bar 10.

To prevent tine 11 from rotating relative to rubber block 20, the inner end of the recess 24 has a downwardly and inwardly inclined groove 30 and projecting downwardly from the bottom of head 26 are ribs 31 which fit into the groove. The interfit of the ribs and the groove angularly lock the tine to the block in addition to the hold provided by the press fit of the tine in the block.

When a rake, pick-up reel or the like is operated with tines mounted as described, the ground engaging free ends 32 of the tines wear away with use. When the axial length of a tine has been shortened a given amount and needs to be replaced, the operator merely removes the bolt 18 to detach the tine structure from bar 10. The he prys the insert 28 free from recess 24 and extracts tine 11 axially through the opening 21 and toward the recess 24 until it is removed. Subsequently, a new tine is inserted in the opposite direction through recess 24 and opening 21 until the head 26 of the new tine seats at the inner end of the recess and ribs 31 fit into groove 30. The insert 28 is then forced back into place and the structure is re-mounted on the bar 10.

With this arrangement, bracket 12, rubber block 20 and insert 28 may be used and time again. When the rake tine 11 becomes worn, it is necessary to replace the tine only.

Preferably, the tine 11, head 26, and bracket 12 are made of steel while the block 20 and insert 28 are made of rubber. It will be understood however that other suitable materials may be employed and when the term rubber is used, for example, it is used generically to encompass any elastomer material which will provide the desired resilient characteristics.

While this invention has been described in connection with a particular embodiment thereof, it will be understood that it is capable of modification, and this application is intended to cover any variations, uses, or adaptation following, in general, the principles of the invention and including such departures from the present disclosure as come within known or customary practice in the art to which the invention pertains, and as fall within the scope of the invention or the limits of the appended claims.

Having thus described my invention, what I claim is:

1. A reuseable resilient mounting for a rake tine and for connecting the tine to a rake bar, comprising a bracket attached to said bar, a rubber block affixed to said bracket and extending outwardly from the bar, said block having a recess extending inwardly from one end of the block facing said rake bar and having an opening extending from said recess to the other end of the block, said bracket having an opening in register with said recess, a rake tine having a body generally perpendicular to said bar and which extends through said block opening, said body having an enlarged head at one end seated in said recess, said head filling only a portion of the depth of said recess whereby a space is formed between the head and said bar, and a rubber insert removably mounted in said recess and engaging both said head and said bar.

2. A reuseable resilient mounting for a rake tine as recited in claim 1 wherein the size of said rubber insert is greater than said space between said tine head and said bar whereby the insert is compressed between the head and bar.

3. A reuseable resilient mounting for a rake tine as recited in claim 1 wherein the transverse dimension of said rubber insert is such that there is an interference fit between the insert and the rubber block.

4. A reuseable resilient mounting for a rake tine as recited in claim 1 wherein said block is bonded to said bracket.

5. A reuseable resilient mounting for a rake tine as recited in claim 1 wherein said enlarged head of said tine has a rib and the inner end at least of said recess has a groove to receive the rib and thereby hold the tine against rotation relative to said block.

6. A reuseable resilient mounting for a rake tine and for connecting the tine to a rake bar, comprising a U-shaped bracket having a bight and legs, said bracket straddling said bar and being connected thereto by fastening means projected through the legs, a rubber block bonded to the bight of said bracket and extending outwardly from said bar, said block having a recess extending inwardly from one end of the block facing said rake bar and having an opening extending from the recess to the other end of the block, said bracket bight having an opening in register with said recess, a rake tine having an elongated body generally perpendicular to said bar and which extends through said block opening, said body having an enlarged head at one end seated in the inner end of said recess, said head filling only a portion of the depth of said recess whereby a space is provided between the head and said bar, said recess and said tine head having a matching shape so that the tine interfits with said block and is prevented from rotating relative thereto, and a rubber insert removably mounted in said recess and engaging both said head and said bar.

References Cited by the Examiner

UNITED STATES PATENTS

| 2,888,993 | 6/59 | Dunning | 56—400 |
| 3,066,470 | 12/62 | Johnston | 56—400 |
| 3,096,609 | 7/63 | Garrett et al. | 56—400 |
| 3,126,693 | 3/64 | Renn | 56—400 |

T. GRAHAM CRAVER, *Primary Examiner.*

ANTONIO F. GUIDA, *Examiner.*